United States Patent [19]

Ibbotson

[11] 3,884,917
[45] May 20, 1975

[54] TERTIARY AMINES
[75] Inventor: Arthur Ibbotson, Blackley, England
[73] Assignee: Imperial Chemical Industries Limited, London, England
[22] Filed: Apr. 29, 1974
[21] Appl. No.: 465,417

[30] Foreign Application Priority Data
May 8, 1973 United Kingdom............... 21827/73

[52] U.S. Cl. ...............260/248 NS; 260/77.5 NC; 260/2.5 AC
[51] Int. Cl............................................ C07d 55/14
[58] Field of Search............................... 260/248 NS

[56] References Cited
UNITED STATES PATENTS
3,732,218   5/1973   Gerd et al............................ 260/248
3,746,709   7/1973   Patton et al. ....................... 260/248

Primary Examiner—John M. Ford
Attorney, Agent, or Firm—Cushman, Darby & Cushman

[57] ABSTRACT

The tertiary amine having the general formula:

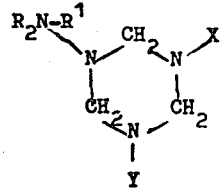

wherein R represents methyl or ethyl, $R^1$ represents ethylene or 1,3-propylene and X and Y, which may be the same or different each represents an organic residue provided that not more than one of X and Y is $R_2N-R^1-$. The amines are useful as catalysts for the reactions of organic isocyanates.

2 Claims, No Drawings

TERTIARY AMINES

This invention relates to tertiary amines which are of value as catalysts for the polymerisation and reaction of isocyanates.

According to the invention there are provided tertiary amines having the general formula:

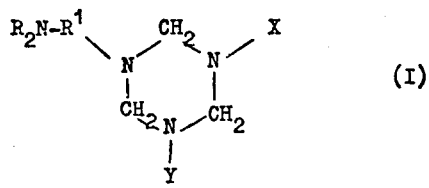

(I)

wherein R represents methyl or ethyl, $R^1$ represents ethylene or 1,3-propylene and X and Y, which may be the same or different each represents an organic residue provided that not more than one of X and Y is $R_2N-R^1-$.

Organic residues which X and Y may represent include monofunctional optionally substituted hydrocarbon radicals. Examples of such radicals include optionally substituted alkyl, cycloalkyl, aralkyl and aryl radicals and alkoxycarbonyl. As examples of optionally substituted alkyl radicals there may be mentioned dialkylaminoalkyl, morpholinoalkyl, piperidinoalkyl, alkylaminoalkyl, aminoalkyl, hydroxyalkyl, alkoxyalkyl and alkylcarbonyloxyalkyl.

Furthermore, one of the organic residues X and Y may be a difunctional optionally substituted hydrocarbon radical such that the tertiary amine has the formula:

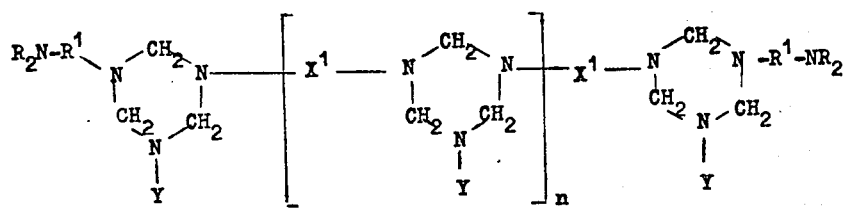

wherein $n$ is zero or a whole number.

Examples of difunctional radicals which may be represented by $X^1$ include alkylene, arylene, carbonyl and thiocarbonyl.

The tertiary amines of the invention may be prepared using methods conventionally employed for the preparation of hexahydrotriazines. A convenient method is to condense the primary amines, $R_2NR^1NH_2$, $XNH_2$ and $YNH_2$ with formaldehyde. The reaction product will be a statistical mixture containing all the possible hexahydrotriazines in various proportions. Amines of the formula $R_2NR^1NH_2$ include 3-dimethylaminopropylamine. Examples of compounds of the formulae $XNH_2$ and $YNH_2$ include n-butylamine, ethanolamine, ethylene diamine, hexamethylene diamine, urea, cyclohexylamine, benzylamine and aniline.

The tertiary amines of the invention are effective catalysts for the trimerisation of organic isocyanates and are especially valuable for the trimerisation of organic polyisocyanates. In order to carry out the trimerisation, the organic polyisocyanate is contacted with at least one of the tertiary amines of the invention.

The trimerisation process may be carried out in the absence or presence of a solvent for the polyisocyanate. Suitable solvents include esters such as ethyl acetate and butyl acetate, ketones such as acetone and methyl ethyl ketone, chloroform, toluene, xylene, monochlorobenzene, o-dichlorobenzene, ethers such as diethyl ether and dibutyl ethers and petroleum ethers. Mixtures of solvents may be used. When the requisite degree of trimerisation has been achieved, further trimerisation may be prevented by rendering the catalyst inactive by treating the product with the calculated amount, or a slight excess, of a strongly acidic substance.

The amount of tertiary amine required to catalyse the trimerisation of organic polyisocyanates depends upon the nature of the polyisocyanate. Amounts within the range 0.01 to 10.0% by weight of the polyisocyanate are generally found useful. A wide range of temperatures may be employed for the trimerisation but usually the lowest practicable temperature is employed.

Any organic polyisocyanate or mixture of polyisocyanates may be trimerised with the aid of the tertiary amines of the invention. Polyisocyanates which may especially advantageously be trimerised include aromatic polyisocyanates such as tolylene -2,4- and 2,6-diisocyanates and mixtures thereof, m- and p-phenylene diisocyanates, naphthylene-1,5-diisocyanate, diphenylmethane -4,4'-diisocyanate and crude diisocyanatodiarylalkane compositions such as may be represented by the general formula:

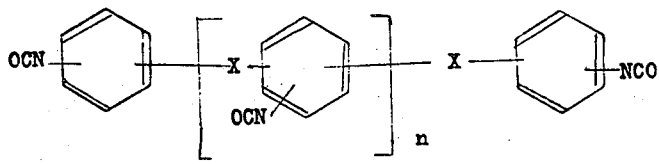

wherein X represents an alkylene radical, especially methylene, and $n$ has an average value of from 0.05 to about 1.2. Particularly useful crude diisocyanatodiarylalkane compositions contain from 30 to 95% especially from 40 to 80%, by weight of diarylalkane diisocyanates, the remainder being largely polyaryl polyalkylene polyisocyanates of functionality greater than two. The manufacture of such compositions has been fully described in the prior art. Other polyisocyanates which may be trimerised include prepolymers, that is to say products made by reacting monomeric or polymeric polyols or polycarboxylic acids with an excess of one or more of the abovementioned polyisocyanates.

The trimerised polyisocyanates may be used in the manufacture of polyurethane elastomers, coatings, adhesives and foams.

If desired, the polyisocyanate may be trimerised in the presence of an isocyanate-reactive material such as a polyol, the polyisocyanate being present in excess with respect to the polyol. In the latter case the product will be a polyisocyanurate-modified polyurethane, the amount of polyisocyanurate depending upon the amount by which the polyisocyanate is in excess.

Also, if desired, the polyisocyanate may be trimerised in the presence of a blowing agent so as to form a polymeric foam containing polyisocyanurate residues.

Thus, according to a preferred embodiment of the invention, a polymeric foam is formed by contacting an organic polyisocyanate with at least one tertiary amine of Formula I in the presence of a blowing agent.

Organic polyisocyanates which may be used in the preparation of foams include those already described above, especially tolylene diisocyanates and crude diphenylmethane diisocyanate compositions and prepolymers formed therefrom.

Suitable blowing agents for use in making foams include water and inert low boiling-point liquids which vaporise under the influence of the exothermic polymerisation reaction.

Suitable low boiling-point liquids are liquids that are inert towards the organic polyisocyanate and have boiling points not exceeding 100°C at atmospheric pressure and preferably not exceeding 50°C. Examples of such liquids are halogenated hydrocarbons and particularly fluorinated hydrocarbon such as trichlorofluoromethane and dichlorodifluoromethane. Such liquids are usually employed in amounts of from 5 to 40% of the weight of polyisocyanate. If the blowing agent has a boiling point below room temperature, frothing techniques may be used.

Water may be used as a blowing agent in conventional amounts according to the type of foam being made. Thus, in rigid foam formulations it is common to use a fluorinated hydrocarbon as the major blowing agent with little or no water whilst in flexible foam formulations it is common to use water as the major blowing agent with little or no fluorinated hydrocarbon.

It is usually preferred to include an organic polyol in the foam-forming reaction mixture, the polyisocyanate being present in an excess with respect to the polyol and any other isocyanate-reactive materials used. The amount of the polyisocyanate excess and the molecular weight and functionality of the polyol are chosen so as to provide the desired degree of flexibility or rigidity in the foamed product.

Polyols which may be used in preparing foams have been fully described in the prior art relating to the manufacture of polyurethane and polyisocyanurate foams. Particular mention may be made of polyols which have been described for use in the processes of U.S. Pat. Nos. 908,337, 1,146,661, 1,184,893 and 1,223,415.

Suitable polyols include polyether polyols prepared by the reaction of one or more alkylene oxides with a compound containing a plurality of active hydrogen atoms, polyester polyols prepared by the reaction of one or more polyhydric alcohols with one or more polycarboxylic acids and also non-polymeric polyols.

For the preparation of flexible foams it is preferred to use polyoxypropylene or poly(oxypropyleneoxyethylene)polyols having from 2 to 4 hydroxyl groups per molecule and hydroxyl equivalent weights within the range 500 to 3500. The polyisocyanate should preferably be used in such an amount as to provide from 1.1 to 2.0 equivalents of isocyanate group for each equivalent of active hydrogen in the foam-forming reaction mixture. The flexible foams have high resilience, relatively smooth stress-strain curves and good self-extinguishing properties.

For the preparation of rigid foams it is preferred to use polyols having from 2 to 8 hydroxyl groups per molecule and hydroxyl equivalent weights within the range 30 to 500, preferably 75 to 300. The polyisocyanate should be used in such an amount as to provide from 3 to 10, preferably from 4 to 6.7 equivalents of isocyanate group for each equivalent of active hydrogen in the foam-forming reaction mixture. The rigid foams have excellent high temperature properties and are extremely resistant to burning.

In addition to the ingredients already mentioned, there may be included in the foam-forming reaction mixture other additives of the types conventionally employed in the production of polymeric foams from organic polyisocyanates. Thus, the reaction mixture may contain organic tin compounds, surface active agents or foam stabilisers for example siloxane-oxyalkylene copolymers and ethylene oxide propylene oxide block copolymers, flame-retardants for example tris chloroethyl phosphate and tris chloropropyl phosphate, fillers and antioxidants.

The foam-forming ingredients may be brought together using any of the mixing means that have been described in the prior art.

The tertiary amines of the invention may also be used as catalysts for the preparation of polyurethanes under such conditions that little or no trimerisation of the polyisocyanate takes place.

The polyurethanes may be in the form of elastomers, coatings, adhesives and foams. They may be prepared using the polyisocyanates, polyols and other ingredients described above, the polyisocyanate being used in an amount approximately equivalent to the isocyanate-reactive materials present in the reaction mixture.

The invention is illustrated but not limited by the following Examples in which all parts and percentages are by weight unless otherwise indicated.

EXAMPLE 1

Two hundred and fifty parts of 36% aqueous formaldehyde (3 mols) are added dropwise to a stirred mixture of 102 parts of 3-dimethylaminopropylamine (1 mol) and 146 parts of n-butylamine (2 mols), the addition rate being controlled to maintain the temperature of the solution below 80°C. Stirring is continued for one hour and then water is removed by heating at about 90°C and a pressure of 30 mm. Hg. The product is a pale straw coloured oil.

The following Table shows further Examples of tertiary amines of the invention which are made by the method of Example 1 using materials in the molar ratios indicated in the Table.

| Example | 2 | 3 | 4 | 5 | 6 | 7 | 8 | 9 | 10 | 11 |
|---|---|---|---|---|---|---|---|---|---|---|
| 3-Dimethylaminopropylamine | 4 | 5 | 2 | 1 | 5 | 6 | 3 | 2 | 4 | 2 |
| Ethanolamine |  |  | 1 | 2 |  |  | 1 | 2 | 1 | 3 |
| Hexamethylene diamine | 1 | 2 |  |  | 2 | 3 | 1 | 1 | 2 | 2 |
| Formaldehyde | 6 | 9 | 3 | 3 | 9 | 12 | 6 | 6 | 9 | 9 |
| Urea |  |  |  |  |  |  |  |  |  |  |
| Viscosity (Poises at 25°C) | 4.4 | 23.4 | 1.6 | – | 19.6 | 78.5 | 14.1 | 64.6 | 65.2 | 754 |
| General Type | A | A | B | B | A | A | A | A | A | A |

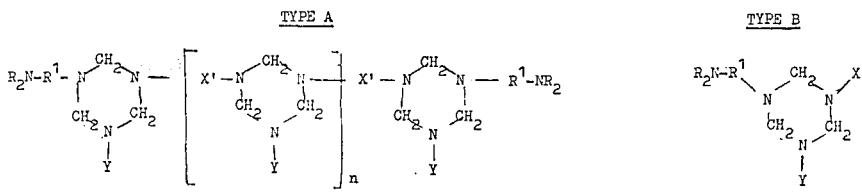

TYPE A      TYPE B

| Example | 12 | 13 | 14 | 15 | 16 |
|---|---|---|---|---|---|
| 3-Dimethylamino propylamine | 2 | 2 | 1 | 4 | 5 |
| n-Butylamine | 1 |  |  |  |  |
| Ethylene diamine |  |  | 1 | 2 |  |
| Formaldehyde | 3 | 3 | 3 | 6 | 9 |
| Urea |  |  |  | 1 | 2 |
| General Type | B | B | B | A | A |

All of the products of Examples 2–16 are homogeneous pale straw coloured liquids except for Examples 13 and 14 which are semi-solids, soluble in water and polyether polyols.

The catalytic activity of the tertiary amines of the invention, when determined in either trimerisation or polyurethane systems, can be shown to be similar to that of the known tris-3-dimethylaminopropyl hexahydro-s-triazine.

EXAMPLE 17

The tertiary amines of Examples 2, 4 and 5 are used in the preparation of flexible foams in accordance with the following formulations.

| Tolylene diisocyanate(80/20) | 45.3 | 45.3 | 45.3 |
|---|---|---|---|
| Polyether | 100 | 100 | 100 |
| Tetrakis-2-hydroxypropyl ethylene diamine | 2.0 | 2.0 | 2.0 |
| Water | 3.5 | 3.5 | 3.5 |
| Siloxane-oxyalkylene copolymer | 0.5 | 0.5 | 0.5 |
| Example 2 amine | 0.3 | — | — |
| Example 4 amine | — | 0.3 | — |
| Example 5 amine | — | — | 0.3 |

The three foams have compression sets at 75% compression of 8.5%, 12.1% and 28.8%. A foam made similarly using 0.3 part of tris-3-dimethylaminopropyl hexahydro-s-triazine as catalyst has a compression set at 75% compression of 54%.

The polyether used in making the foams is a poly(oxypropylene-oxyethylene) triol having a molecular weight of 5,300 and a primary hydroxyl content of 75%.

EXAMPLE 18

The tertiary amines of Examples 1, 2 and 3 are included in the following flexible foam formulation:

| Tolylene diisocyanate (80/20) | 52.3 |
|---|---|
| Crude diphenylmethane diisocyanate | 13.1 |
| Polyether (as described in Example 17) | 100 |
| Water | 3.5 |
| Dimethylaminoethanol | 1.0 |
| Triethylene diamine (33% solution in dipropylene glycol) | 0.6 |
| Tris (chloropropyl)phosphate | 3.0 |
| Glycerol | 3.5 |
| Siloxane-oxyalkylene copolymer | 2.0 |

The amounts of amine included and the effects on foaming are as follows:

| Example 1 amine | 0.3 | 0.7 |  |  |  |
|---|---|---|---|---|---|
| Example 2 amine |  |  | 0.3 | 0.7 |  |
| Example 3 amine |  |  |  |  | 0.3 |
| Cream time (secs) | 5 | 5 | 7 | 4 | 5 |
| Rise time (secs) | 75 | 75 | 80 | 65 | 87 |
| Tack-free time (secs) | 420 | 420 | 480 | 240 | 600 |

All of the foams obtained are highly resilient and have a low closed cell content.

The crude diphenylmethane diisocyanate used in this Example contains approximately 55% of diisocyanatodiphenylmethane isomers, the bulk of the remainder of the isocyanate being present as polymethylene polyphenyl polyisocyanate of functionality greater than than two, the NCO content being 29.2%.

EXAMPLE 19

Two parts of the amine of Example 5 dissolved in 5 parts of ethylene glycol are mixed with 100 parts of crude diphenylmethane diisocyanate (as described in Example 18), 20 parts of trichlorofluoromethane and 1 part of a siloxane-oxyalkylene copolymer, stirring at 2,000 rpm for 5 seconds, and the mixture is poured into a mould. The cream time is 9 seconds, the rise time 80 secs. and the tack-free time 180 seconds. The resulting rigid foam is fine-celled and of low ignitibility.

A similar rigid foam is made from a formulation in which the amine of Example 5 is replaced by an equal amount of the amine of Example 16. In this case the cream time is 12 seconds, the rise time 75 seconds and the tack-free time 215 seconds.

EXAMPLE 20

The following mixture of materials is prepared:

| | |
|---|---|
| Oxypropylated glycerol (molecular weight 300) | 100 |
| Oxypropylated glycerol (molecular weight 150) | 15 |
| Water | 3 |
| Siloxane-oxyalkylene copolymer | 0.8 |
| Tris chloropropyl phosphate | 30 |
| Amine of Example 3 | 4 |

To this mixture are added 60 parts of trichlorofluoromethane and 243 parts of crude diphenylmethane diisocyanate (as described in Example 18), stirring for 10 seconds at 2,000 rpm. The foaming mixture is poured into a mould from which the rigid foam product is removed after 24 hours. The foam has a density of 2lb/cu ft., a high closed cell content and good strength.

Similar foams are made using the tertiary amines prepared in accordance with the other Examples.

I claim
1. A tertiary amine having the formula:

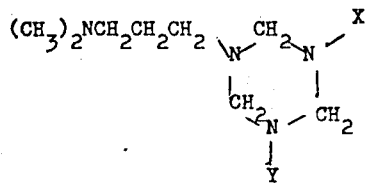

wherein X represents dimethylaminopropyl, lower alkyl, amino lower alkyl or hydroxy lower alkyl and Y represents lower alkyl, amino lower alkyl or hydroxy lower alkyl.

2. A tertiary amine having the formula:

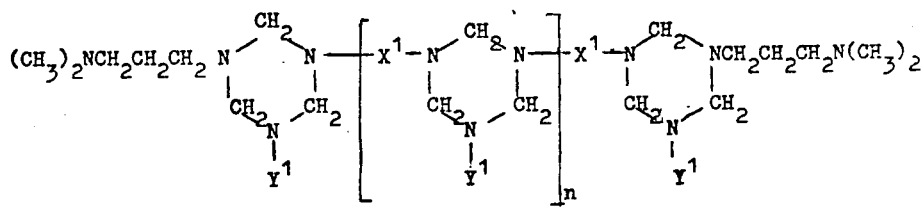

wherein $X^1$ represents alkylene having up to 6 carbon atoms or carbonyl, $Y^1$ represents dimethylaminopropyl or hydroxy lower alkyl and n has a value of 0, 1 or 2.

* * * * *